April 5, 1955   J. A. NORGAARD   2,705,627
PORTABLE APPARATUS FOR STRESS-RELIEVING OF VESSELS
Filed Dec. 27, 1950
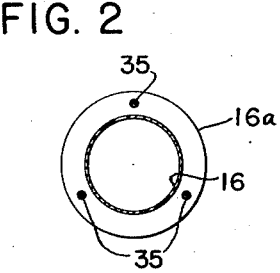
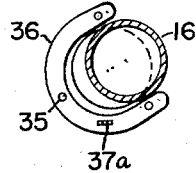
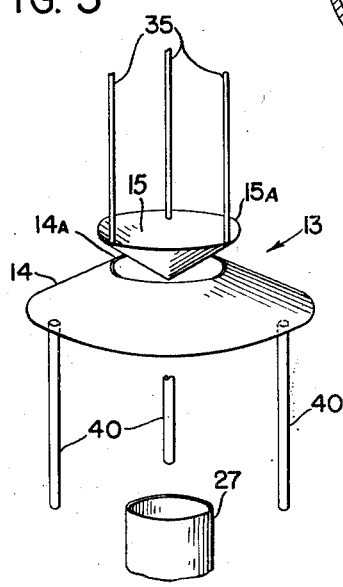
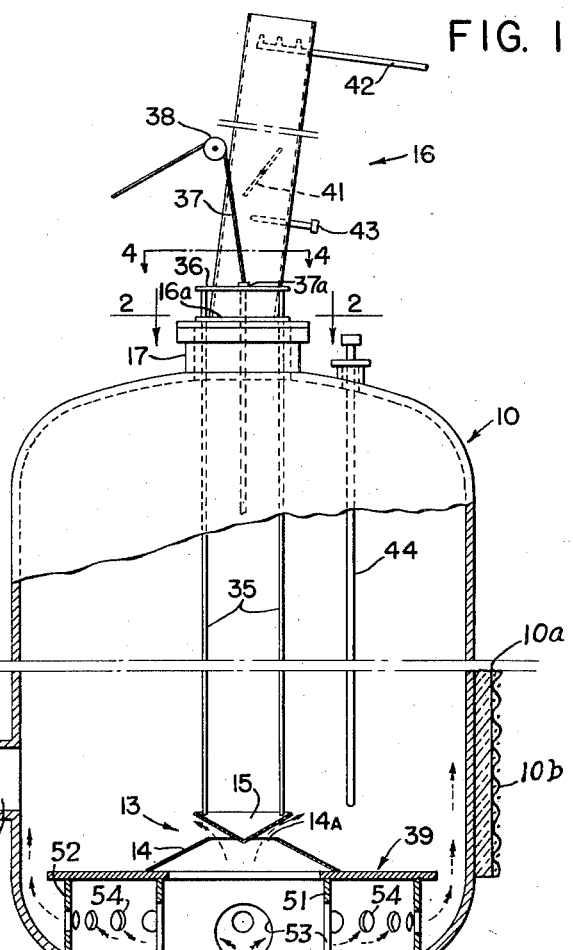
INVENTOR.
JENS A. NORGAARD
BY: *Everett A. Johnson*
ATTORNEY

United States Patent Office 2,705,627
Patented Apr. 5, 1955

2,705,627

PORTABLE APPARATUS FOR STRESS-RELIEVING OF VESSELS

Jens A. Norgaard, Highland, Ind., assignor to Standard Oil Company, Chicago, Ill., a corporation of Indiana Application December 27, 1950, Serial No. 202,844

6 Claims. (Cl. 263—5)

This invention relates to apparatus for heat-treating vessels. More specifically the invention pertains to heat-treating vessels incident to fabrication and modification of the vessels in the field.

Frequently in installation and modification of vessels it is necessary to make additions to such vessels for the purpose of providing nozzles, manways, etc. Likewise, many of these vessels are so constructed and of such size that erection of the vessels involves the welding of sections in the field. These welding operations result in setting up within the vessel structure in and about the welded portions certain irregular stresses. To insure safe and proper operation with maximum life of the welded structures, it is necessary to relieve these stresses. Obviously, it would be difficult and uneconomic to erect a temporary or knock-down heat-treating furnace which would be of sufficient capacity to properly enclose for heat-treating the large vessels now frequently used in refinery operations. Heretofore it has been proposed to heat-treat a vessel subsequent to the welding or fabricating operations by segregating a portion of the vessel and introducing hot gases while insulating the exterior of the segregated portion of the vessel. Likewise, it has been proposed to blanket the vessel with a thermal insulation and intermittently reverse the flow of heated gases through the vessel to minimize metal temperature gradients within the welded vessel. Also circumferential areas of vessels have been stress-relieved by wrapping the vessel with beaded electrical resistance heaters and insulating over the heaters. Neither of these systems has been completely satisfactory from the operating standpoint and has not adequately met the problems of stress-relieving in field-fabricated vessels.

It is therefore a primary object of my invention to provide an improved means for heat-treating vessels incident to field fabrication where welding techniques have been employed. A more specific object of my invention is to provide an apparatus for convenient and efficient heat-treating of an erected vessel whereby I attain uniform and controlled heating of the entire vessel without difficulties inherent in the prior art systems. A further object of the invention is to provide a portable apparatus for stress-relieving operations which may be temporarily integrated with the vessel to be treated. These and other objects of my invention will be apparent as the detailed description of my invention proceeds.

Briefly my invention utilizes a portable furnace for generating hot flue gases and an adjustable gas distributor comprising a combination of inverted conical baffle means and an adjustable plug for controlling the flow of hot gases within the vessel. A stack with volume and flow direction control means is fixed to one portion of the vessel remote from the point of introducing the hot gases. By manipulation of the combination of furnace gas inlet and outlets, the temperature of the vessel can be regulated. The invention will be best understood by reference to the accompanying drawing wherein:

Figure 1 is an elevation showing the apparatus partly in section and in conjunction with a pressure vessel to be heat treated;

Figure 2 is a plan view of the furnace taken along the line 2—2 in Figure 1;

Figure 3 is a perspective view illustrating the details of the gas distributor means; and Figure 4 is a plan view of the stack and collar taken along the line 4—4 in Figure 1.

My invention will be described with reference to the operation and the apparatus details of the equipment shown in the drawings. The pressure vessel 10 of Figure 1 is of a type used in a hydroforming operation. A typical vessel 10 may be about 26.5 feet in height and about 15 feet in diameter having a metal wall thickness of between about 2.5 and 3 inches. The fabrication or modification of such a vessel in the field includes welding operations. This procedure requires subsequent stress relieving of the vessel before its use under high temperature and pressure conditions.

For such a stress-relieving operation I employ a furnace 11 which is fixed to the bottom nozzle 12 of the vessel 10. An adjustable gas distributor 13 comprising the lower conical baffle 14 and an adjustable internal cone plug 15 is supported within the vessel 10. The inverted cone plug 15 and the truncated conical baffle 14 may be made of 18-8 chromium steel. A stack 16 is mounted on the top nozzle 17 of the vessel and may be set on an angle to avoid structural steel above the vessel 10. The stack 16 may for example be made of a plurality of flanged pipe sections of 24 inch I. D. pipe rolled from $3/16$ inch plate.

The furnace 11 comprises an upper furnace section 18 provided with an upper flange 19 for attachment to the bottom nozzle 12 and a lower flange 20 for joining with the lower burner section 21 by means of flange 22. In the lower burner section 21 I provide three or four burners 23 passing through a bottom burner plate 24. The furnace 11 is provided with a refractory liner 25 which may for example be about 2.25 inches of refractory concrete.

A furnace air jet 26 passes through the wall of the furnace section 18. The hot gases are discharged through furnace duct 27 which extends through bottom nozzle 12 into the vessel 10. An annular flow passage 28 is provided between the duct 27 and the nozzle 12 and communicates with the bottom vents 29 and 30 which may be about ten inches in diameter. Within these vents 29 and 30 are vent dampers 31 and 32 and vent air jets 33 and 34. These vent assemblies are used to control the flow of heating and cooling gases as will be described below.

The hot gases discharging from the duct 27 are directed onto the adjustable gas distributor 13. In a typical installation, the truncated conical baffle 14 has a bottom diameter of about 72 inches, is 15 to 20 inches, e. g. about 16 inches, high, and has an upper port 14a of about 24 inches in diameter. The plug 15 is of such size as to not only close the port 14a but to provide a tapered baffle surface for diverting the gases toward the wall of the vessel 10. Thus it may be a cone about 12 inches high and about 36 inches across its base.

A plurality of support rods 35, which may be about $3/8$ inch in diameter, are fixed as by bolting at their lower ends to the upper rim 15a of the internal cone plug 15. The rods 35 pass upwardly within the vessel 10 through the top nozzle 17 and slideably through the base flange 16a of the stack 16 and bolted to the adjusting collar 36. A cable 37 fastened at 37a to the adjusting collar 36 passes over pulley 38 and controls the position of the cone plug 15 by raising and lowering the rods 35. The position of the cone plug 15 is adjusted with reference to the opening 14a in the conical baffle 14 to provide the desired volume and direction of gas flow.

In Figure 1 the conical baffle 14 rests upon steel plates which form an annular baffle 39 extending across the tops of concentric cylindrical skirts 51 and 52 which had been installed during the erection of the vessel as supports for a catalyst-supporting grate (not shown). In a typical installation such as illustrated in Figure 1, the inner skirt 51 may be about 3 feet high and 4 to 5 feet in diameter with large ports 53 of about 2 feet in diameter. The outer skirt 52 has a diameter of about 9 to 10 feet, a vertical height of about 2 feet and a plurality of ports 54 of about 8 inches in diameter.

In Figure 3 the baffle 14 is illustrated as supported by uprights or legs 40. Whatever the means of support, it is preferred that the gas distributor 13 be located within the quarter of the vessel nearest the inlet of the hot gases. For example where the vessel 10 has a length L it is preferred that the distributor 13 be placed between about ⅛ L to ⅙ L from the end where the furnace duct 27 introduces the heating gases.

The stack 16 contains a stack damper 41, reversible stack air jets 42 and a stack thermocouple well 43. Additional thermocouple wells include the internal well 44 and the furnace thermocouple well 45. These temperature-indicating means 43, 44 and 45 are used for controlling the flow of gases and hence the temperature through portions of the assembly including the furnace 11, the vessel 10 and the stack 16.

An exhaust line 46 communicates with the nipple or manway 47 on the side of the vessel 10 and is equipped with exhaust line damper 48, exhaust air jet 49 and injection air jet 50. The manway 47 may, for example, be about 24 inches I. D. and the exhaust line about 4 inches I. D.

To heat the vessel 10 the furnace 11 is operated by burning gas and the hot burned gases introduced into the vessel 10 via duct 27. A positive draft is maintained on the vessel 10 by the reversible stack air jets 42. As the vessel increases in temperature, thermocouples (not shown) arranged about the exterior of the vessel indicate whether it is being heated uniformly. If the bottom, for example, becomes much hotter than the sides and top, the cone plug 15 is raised to allow more gases to pass directly through the gas distributor 13 to the top and sides of the vessel 10. The purpose of the exhaust line 46 and air jet 50 on the side exit nipple or manway 47 is to control the flow of the hot gases thereby allowing the nipple 47 to be heated uniformly with the remainder of the vessel. Likewise, a portion of the hot gases can be withdrawn through the annular flow passage 28 and bottom vents 29 and 30 to control the temperature of the bottom nozzle 12.

After the heat treatment, when it is desired to cool the vessel 10, the furnace is shut off. If desired, the lower burner section 21 may be removed and a blind (not shown) placed across the lower flange 20. The air jets 42 in the stack 16 are then reversed thereby forcing cool air into the vessel 10. The furnace air jet 26 is turned off and the two air jets 33 and 34 in bottom vents 29 and 30 are open to draw the air from inside the vessel 10. The air jet 50 in the line 46 is used to draw cooling air through the nipple 47.

In the heat treating procedure, excessive temperature differentials in the metal of the vessel 10 should be avoided and for this purpose the vessel is insulated before the heating begins. This insulation 10a may be about four inches of Copper-Fiber Felt (8# density) and may be held in place with wires or wire mesh 10b. In general, the insulation may consist of a mineral wool blanket held securely against the metal surfaces.

In an example of the procedural steps employed in heat treating a hydroformer reactor, the air jet 42 in the stack 16 may be opened to one-half capacity and the stack damper 41 placed in a 30 percent closed position. The damper 48 is fully opened and the air jets 49 and 50 are closed in the exhaust line 46. The internal cone plug 15 is controlled by the cable 37 at the stack base to be open approximately six inches. The furnace air jet 26 is opened slightly and the opening in the bottom burner plate 24 is set at approximately four inches. The dampers 31 and 32 in the bottom vents 29 and 30 are set at about 45° angle and the air jets 33 and 34 remain closed. The burners 23 are set at a medium flame and the initial heating is done with a furnace temperature of approximately 800° F. This temperature is raised at a rate not to exceed about 145° F. per hour. To effect this increase in temperature, the opening in the bottom burner plate 24 is adjusted as the temperature is indicated by the thermocouple 45.

When the vessel approaches a temperature of about 400° F. the burners 23 are opened further and the temperature of the furnace 11 is raised gradually to a maximum of approximately 1600° F. When this temperature level is reached the air jets 42 are opened fully. Concurrently the dampers and jets in vents 29 and 30 and line 46 are adjusted to maintain the desired temperatures. Any portion of the vessel 10 that lags behind other portions thereof in temperature may be brought into line by opening jets 33, 34 and 49 to cause more hot gases to be drawn to that portion of the vessel which is low in temperature. Likewise any portion of the vessel which becomes overheated before other portions may be brought back to the desired temperature level by closing the vent dampers 31, 32, 41 and 48 thereby causing less heat to be drawn to the part of the vessel adjacent the particular damper.

When the vessel 10 reaches a temperature of approximately 850° F. the temperature of the furnace 11 may be increased to approximately 1700° F. by adjusting the burner plate 24, and making other adjustments in the damper and jet controls if necessary to maintain a minimum temperature differential in the vessel 10 as indicated by the thermocouple means 43, 44 and 45. When the vessel 10 has reached a temperature of about 1100° F., that temperature is held for a soaking time of about eight hours.

After the holding or soaking period, the vessel 10 is cooled at a maximum rate of about 180° F. per hour. In cooling the vessel the burners 23 are turned down as required; the air jets 42 in the stack 16 are inverted to blow down into the vessel 10 and the stack damper 41 is opened. Likewise the jets and dampers in the bottom vents 29 and 30 and the exhaust line 46 are opened. The various jets and dampers are then adjusted from time to time to maintain the desired rate of cooling and blowing with cool air continued until the desired terminal temperature of about 600° F. is attained. At this temperature all air jets and dampers are closed and the vessel allowed to cool in still air until it reaches atmospheric temperature. The insulation is removed from the exterior of the vessel 10 after the cooling period.

The gas distributor 13 has been described as comprising a conical baffle 14 supported from the bottom of vessel 10 being treated and an adjustable cone plug 15 suspended from an upper part of the vessel 10. It is contemplated, however, that the elements 14 and 15 of the distributor 13 may be linked so as to be supported as a unit by the rods 35 or similar adjustable structure. The unitary gas distributor 13 should preferably be within the lower quarter of the vessel nearest the treating gas inlet and may be adjusted vertically to attain distribution of the hot gases downwardly and laterally before they proceed longitudinally through the vessel. In general, however, it is preferred to provide for adjustment between the cone plug 15 and the baffle 14 even though these elements are movable as a unit within the vessel 10.

Although I have described my invention with reference to a specific apparatus which is set forth in considerable detail, it should be understood that this is by way of illustration only and that my invention is not necessarily limited thereto. Alternative apparatus and operating techniques will become apparent to those skilled in the art in view of my disclosure. Accordingly, modifications are contemplated without departing from the spirit of the described invention or the scope of the appended claims.

I claim:

1. An apparatus for heat-treating a generally cylindrical and vertically disposed metal vessel having a first port, a second port, and a side manway, the improvement which comprises a portable furnace adapted to be fixed exteriorly to the vessel, means for discharging the gases generated in said furnace through said first port, a gas distribution means restricting the flow of gases from said first port longitudinally through said vessel, said gas distribution means comprising a truncated conical baffle supported at its base and having an upper discharge port, a flow restricting conical plug adapted to control said last-mentioned port, means exterior of said vessel for determining the position of said plug with reference to said conical baffle, a portable stack adapted to be placed in communication with said second port, flow-control means in said stack, an auxiliary exhaust line adapted to be placed in communication with said side manway, and flow direction control means in said stack and in said exhaust line.

2. An apparatus for heat-treating welded vessels in the field which comprises a portable furnace, a portable stack, means for mounting said furnace and said stack on remote exterior portions of a ported vessel to be treated, and an adjustable gas distribution means interpositioned in the normal flow path between said furnace and said stack, said distribution means comprising a ported conical baffle supported at its base and an inverted cone plug for controlling flow through said ported baffle, said baffle being of substantial lateral dimensions so as to divert a major portion of the gases downwardly and laterally within the vessel to be treated, and means for adjusting the relative spacing of said ported baffle and said conical plug.

3. A gas distribution means for use in controlling the flow of gases through a vessel which comprises a truncated conical baffle flared outwardly and downwardly and supported at its base, a central port in said baffle, a movable plug for said port comprising an inverted conical member, and means for remotely controlling the position of the plug with reference to the port in said baffle.

4. An apparatus for heat-treating an erected vessel having a lower inlet means, an upper outlet means, a side manhole means, and a support means within said vessel, the improvement which comprises a portable hot gas generator having means adapted for fixing the generator exteriorly to the vessel, an inlet gas duct adapted to extend between said generator and the inlet means of said vessel, a portable gas distribution means adapted to be placed upon said support means within said vessel comprising a truncated conical baffle adapted to be supported at its base and an inverted conical plug spaced above said baffle, rod means fixed to said inverted plug for adjusting the relative positions of said plug and said truncated conical baffle, said rod means being adapted to extend through the top of said vessel, a stack means adapted to be placed in communication with the upper outlet means of such vessel, a lower vent sleeve arranged concentrically about said gas duct, and a side vent means adapted to be placed in communication with said side manhole, said vent and stack means being provided with adjustable damper means and controllable ejection air jets.

5. An apparatus for heat-treating a welded vessel for the purpose of relieving stresses therein which comprises a thermal insulation means removably applied to the exterior of the vessel, gas generator means adapted for flowing a hot gas into the vessel and longitudinally thereof, controllable ported baffle means adapted to be supported within the vessel adjacent one end thereof for distributing a major portion of the incoming hot gases laterally immediately adjacent the inlet to the vessel, stack means adapted to be removably fixed to an upper part of the vessel for circulating the gases therefrom by causing the gases to flow longitudinally within and from the vessel, and controllable damper means exterior of said vessel for periodically diverting varying proportions of gas laterally from the vessel to minimize metal temperature gradients during the heating operation.

6. An apparatus for heat-treating an erected welded steel vessel having inlet and outlet means on remote portions of the vessel and a manhole means intermediate the ends of such vessel, the improvement which comprises portable gas generator means for generating heating gas exteriorly of the vessel, conduit means adapted to removably extend between said generator and said inlet means of said vessel for introducing a flow of hot gas from said external generator into the interior of the vessel at an elevated temperature, outlet conduit means adapted to be fixed to said manhole means for partially diverting the initial flow of gases within said vessel in a direction transverse to the longitudinal axis of the vessel, stack means for educting gases from the vessel adapted to be removably fixed to the outlet means disposed longitudinally remote from the inlet means, and a gas distribution means adapted to be supported within said vessel adjacent said inlet means for controlling the flow of gases through the vessel, which distribution means comprises a truncated conical baffle means having a centrally located port, a movable inverted conical plug for said port, and means for remotely controlling the position of the said plug with reference to the said port whereby flow of the hot gases across and through the vessel is controlled to produce uniform heat transfer from the hot gases to the welded interior of the vessel.

References Cited in the file of this patent

UNITED STATES PATENTS

| | | |
|---|---|---|
| 646,567 | Beeson | Apr. 3, 1900 |
| 655,092 | Kopping | July 31, 1900 |
| 1,052,512 | Phillips | Feb. 11, 1913 |
| 1,544,015 | Lamy | June 30, 1925 |
| 2,137,523 | Bergstrom | Nov. 22, 1938 |
| 2,234,871 | MacDonald | Mar. 11, 1941 |
| 2,294,168 | Francis et al. | Aug. 25, 1942 |
| 2,311,344 | Machlet | Feb. 16, 1943 |
| 2,429,320 | Kennedy | Oct. 21, 1947 |
| 2,464,248 | Maxwell et al. | Mar. 15, 1949 |